US011949180B2

(12) United States Patent
Wang et al.

(10) Patent No.: US 11,949,180 B2
(45) Date of Patent: Apr. 2, 2024

(54) PCIE/SAS CONNECTOR STRUCTURE

(71) Applicant: Amphenol East Asia Electronic Technology (Shenzhen) Co., Ltd., Shenzhen (CN)

(72) Inventors: Xiang Wang, Shenzhen (CN); Yan-Bin Tan, Shenzhen (CN); Lei Liao, Shenzhen (CN); Wei Luo, Shenzhen (CN); Jing-Tang Zhou, Shenzhen (CN)

(73) Assignee: Amphenol East Asia Electronic Technology (Shenzhen) Co., Ltd., Shenzhen (CN)

( * ) Notice: Subject to any disclaimer, the term of this patent is extended or adjusted under 35 U.S.C. 154(b) by 17 days.

(21) Appl. No.: 17/476,002

(22) Filed: Sep. 15, 2021

(65) Prior Publication Data

US 2023/0047671 A1 Feb. 16, 2023

(30) Foreign Application Priority Data

Aug. 13, 2021 (CN) ......................... 202121892308.3

(51) Int. Cl.
*H01R 12/71* (2011.01)
*H01R 13/6581* (2011.01)
(Continued)

(52) U.S. Cl.
CPC ....... *H01R 12/716* (2013.01); *H01R 13/6581* (2013.01); *H01R 13/6585* (2013.01);
(Continued)

(58) Field of Classification Search
CPC .............. H01R 12/716; H01R 13/6581; H01R 13/6585; H01R 24/62; H01R 12/70;
(Continued)

(56) References Cited

U.S. PATENT DOCUMENTS 7,581,990 B2 9/2009 Kirk et al.
8,462,502 B2 6/2013 Hirano et al.
(Continued)

FOREIGN PATENT DOCUMENTS

CN 2840353 Y 11/2006
CN 202585857 U 12/2012
(Continued)

OTHER PUBLICATIONS

[No Author Listed], SFF Committee SFF-8639 Specification for Multifunction 6X Unshielded Connector. Rev 2.1. SNIA SFF TWG Technology Affiliate. May 26, 2017. 26 pages.
(Continued)

*Primary Examiner* — Abdullah A Riyami
*Assistant Examiner* — Justin M Kratt
(74) *Attorney, Agent, or Firm* — Wolf, Greenfield & Sacks, P.C.

(57) ABSTRACT

A PCIe/SAS connector structure includes a female part and a male part; the female part is engaged with the male part; wherein the female part has a female plastic member, a female cover, a female signal terminal part, a fix pin and a female signal and power terminal; wherein the male part has a male plastic member, a male cover, a male signal and power terminal, a male terminal, and a fix plate; wherein the female cover is in a full-wrap structure; wherein the female cover has a protruding elastic plate, respectively; wherein the male terminal is formed in an L shape; two male terminals are fixed as a set by a plastic; the male terminal is inserted to be positioned in the male cover; wherein the male cover is formed in an L shape in a full-wrap structure. Interference performance of signal terminal is improved.

20 Claims, 5 Drawing Sheets

(51) Int. Cl.

| | |
|---|---|
| ***H01R 13/6585*** | (2011.01) |
| ***H01R 24/62*** | (2011.01) |
| *H01R 12/70* | (2011.01) |
| *H01R 13/6582* | (2011.01) |
| *H01R 13/6583* | (2011.01) |
| *H01R 13/6586* | (2011.01) |
| *H01R 13/6587* | (2011.01) |
| *H01R 13/659* | (2011.01) |
| *H01R 13/6591* | (2011.01) |
| *H01R 24/64* | (2011.01) |

(52) U.S. Cl.
CPC ............. *H01R 24/62* (2013.01); *H01R 12/70* (2013.01); *H01R 12/71* (2013.01); *H01R 12/712* (2013.01); *H01R 13/6582* (2013.01); *H01R 13/6583* (2013.01); *H01R 13/6586* (2013.01); *H01R 13/6587* (2013.01); *H01R 13/659* (2013.01); *H01R 13/6591* (2013.01); *H01R 24/64* (2013.01); *H01R 2201/06* (2013.01)

(58) Field of Classification Search
CPC .. H01R 12/71; H01R 12/712; H01R 13/6582; H01R 13/6583; H01R 13/6586; H01R 13/6587; H01R 13/659; H01R 13/6591; H01R 24/64; H01R 2201/06
See application file for complete search history.

(56) References Cited

U.S. PATENT DOCUMENTS

| | | | | |
|---|---|---|---|---|
| 8,585,440 | B2 | 11/2013 | Jiang et al. | |
| 8,657,627 | B2 | 2/2014 | McNamara et al. | |
| 8,702,451 | B2 | 4/2014 | Luo et al. | |
| 8,740,631 | B2 | 6/2014 | Chen | |
| 8,858,243 | B2 | 10/2014 | Luo et al. | |
| 9,077,118 | B2 | 7/2015 | Szu et al. | |
| 9,225,090 | B2 | 12/2015 | Chen | |
| 9,407,022 | B1 * | 8/2016 | Wang ................. | H01R 13/6275 |
| 9,520,680 | B2 | 12/2016 | Hsu et al. | |
| 9,564,714 | B1 | 2/2017 | Wang et al. | |
| 9,831,605 | B2 | 11/2017 | Buck et al. | |
| 9,941,641 | B1 * | 4/2018 | Jiang .................. | H01R 13/6599 |
| 9,985,391 | B1 | 5/2018 | Wang | |
| 10,283,910 | B1 | 5/2019 | Chen et al. | |
| 10,411,376 | B1 | 9/2019 | Wang et al. | |
| 10,651,589 | B1 | 5/2020 | Wang et al. | |
| 10,763,608 | B1 | 9/2020 | Wang et al. | |
| 11,050,176 | B2 | 6/2021 | Yang et al. | |
| 11,251,554 | B1 | 2/2022 | Tan et al. | |
| 11,581,687 | B2 | 2/2023 | Wang et al. | |
| 2014/0004744 | A1 | 1/2014 | Hsu et al. | |
| 2014/0211389 | A1 | 7/2014 | Zhou et al. | |
| 2018/0205181 | A1 | 7/2018 | Chen et al. | |
| 2019/0214753 | A1 | 7/2019 | Jiang et al. | |
| 2020/0028289 | A1 | 1/2020 | Dai et al. | |
| 2021/0044060 | A1 | 2/2021 | Wu et al. | |
| 2021/0399455 | A1 | 12/2021 | Wang et al. | |
| 2022/0077614 | A1 | 3/2022 | Tan et al. | |
| 2022/0302655 | A1 | 9/2022 | Wang et al. | |
| 2022/0360000 | A1 | 11/2022 | Tan et al. | |
| 2023/0050934 | A1 | 2/2023 | Yin et al. | |
| 2023/0122686 | A1 | 4/2023 | Wang et al. | |
| 2023/0124724 | A1 | 4/2023 | Tan et al. | |
| 2023/0125645 | A1 | 4/2023 | Yin et al. | |

FOREIGN PATENT DOCUMENTS

| | | | | | |
|---|---|---|---|---|---|
| CN | 203205638 | U | | 9/2013 | |
| CN | 103515792 | A | | 1/2014 | |
| CN | 203850501 | U | | 9/2014 | |
| CN | 104283080 | A | | 1/2015 | |
| CN | 204376132 | U | | 6/2015 | |
| CN | 205016785 | U | | 2/2016 | |
| CN | 103887641 | B | | 6/2016 | |
| CN | 205944534 | U | | 2/2017 | |
| CN | 206962152 | U | | 2/2018 | |
| CN | 207116835 | U | | 3/2018 | |
| CN | 207517943 | U | | 6/2018 | |
| CN | 109004437 | A | | 12/2018 | |
| CN | 208284706 | U | | 12/2018 | |
| CN | 208433570 | U | | 1/2019 | |
| CN | 209675519 | U | | 11/2019 | |
| CN | 109659740 | B | * | 9/2020 | ........... H01R 12/716 |
| CN | 112103723 | A | * | 12/2020 | ........... H01R 13/516 |
| CN | 212380677 | U | | 1/2021 | |
| CN | 111769395 | B | | 2/2022 | |
| CN | 215816686 | U | | 2/2022 | |
| CN | 217691950 | U | | 10/2022 | |
| TW | I505580 | B | | 10/2015 | |
| TW | I509921 | B | | 11/2015 | |
| TW | M546036 | U | | 7/2017 | |
| TW | M563682 | U | | 7/2018 | |
| TW | M573906 | U | | 2/2019 | |
| TW | M584561 | U | | 10/2019 | |
| TW | M606366 | U | | 1/2021 | |
| TW | M618868 | U | | 11/2021 | |
| TW | M621514 | U | | 12/2021 | |

OTHER PUBLICATIONS

[No Author Listed], SFF-TA-1001 Specification for Universal x4 Link Definition for SFF-8639. Rev 1.1. SNIA Advance storage & information technology. May 28, 2018. 20 pages.

Mason et al., SAS Standards and Technology Update. Storage Developer Conference (SDC). 2011. 46 pages. URL:https://www.snia.org/sites/default/orig/SDC2011/presentations/monday/HarryMason_SAS%20_Standards_Technology_Updater1.pdf [last accessed Jun. 2, 2022].

Tan et al., PSAS 5.0 Female Connector, U.S. Appl. No. 17/307,276, filed May 4, 2021.

Wang et al., PSAS Female Connector, U.S. Appl. No. 17/204,484, filed Mar. 17, 2021.

[No Author Listed], SFF Committee SFF-8639 Specification for Multifunction 6X Unshielded Connector. Rev 2.1. Development. SNIA SFF TWG Technology Affiliate. May 26, 2017. 32 pages.

Cao et al., High Speed Electrical Connector, U.S. Appl. No. 18/097,778, filed Jan. 17, 2023.

Cao et al., High Speed Electrical Connector, U.S. Appl. No. 18/097,805, filed Jan. 17, 2023.

Hou et al., High Speed Plug Connector, U.S. Appl. No. 18/323,469, filed May 25, 2023.

He et al., High Speed Electrical Connector, U.S. Appl. No. 18/354,816, filed Jul. 19, 2023.

Yang et al., PSAS Receptacle Connector, PSAS Plug Connector And Interconnection System Therewith, U.S. Appl. No. 18/240,401, filed Aug. 31, 2023.

Yin et al., High Speed, High Performance Electrical Connector, U.S. Appl. No. 18/448,239, filed Aug. 11, 2023.

U.S. Appl. No. 17/874,814, filed Jul. 27, 2022, Yin et al.

U.S. Appl. No. 17/848,851, filed Jun. 24, 2022, Yin et al.

U.S. Appl. No. 18/076,066, filed Dec. 6, 2022, Wang et al.

U.S. Appl. No. 18/084,454, filed Dec. 19, 2022, Tan et al.

U.S. Appl. No. 18/097,778, filed Jan. 17, 2023, Cao et al.

U.S. Appl. No. 18/097,805, filed Jan. 17, 2023, Cao et al.

U.S. Appl. No. 18/323,469, filed May 25, 2023, Hou et al.

U.S. Appl. No. 18/354,816, filed Jul. 19, 2023, He et al.

U.S. Appl. No. 18/448,239, filed Aug. 11, 2023, Yin et al.

U.S. Appl. No. 18/240,401, filed Aug. 31, 2023, Yang et al.

* cited by examiner

PCIE/SAS CONNECTOR STRUCTURE

RELATED APPLICATIONS

This application claims priority to and the benefit of Chinese Patent Application Serial No. 202121892308.3, now Chinese Utility Model Patent No. CN215816686U, filed on Aug. 13, 2021, the entire content of which is incorporated herein by reference in its entirety.

BACKGROUND OF THE INVENTION

1. Field of the Invention

The present invention relates generally to electrical connectors, such as those used to interconnect electronic assemblies.

2. Description of the Related Art

With continuously growing data storage amount, the requirement on the transmission rate becomes higher, which represents, in the field of high-speed transmission, the increase of clock frequent and the rapid decrease of the rising time. Such changes impose higher demand for the transmission rate of connectors. In other words, the requirement of the bandwidth (i.e. the transmission rate) of the connector becomes higher. The main issue to be improved in the high-speed transmission is interference.

SUMMARY OF THE INVENTION

To improve the issues above, a high transmission rate Peripheral Component Interconnect Express (PCIe)/Serial Attached SCSI (SAS) (as known as PCIe/SAS) connector with interference improvement is disclosed.

For achieving the aforementioned objectives, the present invention provides:

a PCIe/SAS connector structure comprising a female part and a male part; the female part is engaged with the male part; wherein the female part comprises a female plastic member, a female cover, a female signal terminal part, a fix pin and a female signal and power terminal; wherein the female signal and power terminal is engaged in the female plastic member and arranged in a single-row pins structure; the female signal terminal part is inserted in the female cover; wherein the female cover is inserted in the female plastic member; the female plastic member comprises an engagement groove on two sides thereof, respectively; wherein the fix pin is inserted in the engagement groove; wherein the male part comprises a male plastic member, a male cover, a male signal and power terminal, a male terminal, and a fix plate; wherein the male signal and power terminal is inserted in the male plastic member and arranged in a single-row pins structure; the male terminal is inserted in the male cover; wherein the male cover is inserted in the male plastic member; the male plastic member comprises an engagement notch on two sides thereof, respectively;

wherein the fix plate is inserted in the engagement notch.

Preferably, the female signal terminal part has a box body disposed at the middle thereof; the box body has one end provided with an arc terminal, and another end provided with a downward bent terminal exposed from the box body; wherein the female cover is in a full-wrap structure; each box body corresponds to a female cover; the female cover comprises an opening; wherein the arc terminal of the female signal terminal part is exposed from the opening; wherein the female cover comprises a protruding elastic plate, respectively.

Preferably, the male terminal is formed in an L shape; two male terminals are fixed as a set by a plastic; the male terminal is inserted to be positioned in the male cover; wherein the male cover is formed in an L shape in a full-wrap structure, wherein the male cover comprises an opening from which the male terminal is exposed.

Preferably, a plurality of male covers contact each other to form an overall cover; wherein the male cover comprises a weld foot, and two male covers are welded as a set on a pad; the male cover is a male grounding terminal applied for connection with a ground of a Printed Circuit Board (PCB).

Preferably, a plurality of female covers contact each other to form an overall cover; wherein the female cover comprises a weld foot, and two female covers are welded as a set on a pad; the female cover is a female grounding terminal applied for connection with a ground of a PCB.

Preferably, the elastic plate of the female cover, when in engagement, contacts the corresponding male grounding terminal.

Preferably, the male cover has one end thereof sealed, with another end thereof provided with an opening.

Preferably, the male terminal has one end thereof abutting against the sealed end of the male cover, with the terminal of another end of the male terminal extending out from another opening on the other end of the male cover.

Preferably, two sides of the opening of the male cover comprises an outwardly opened elastic board, wherein, in engagement, the elastic boards on two sides of the male cover contact the female grounding terminal.

With such configuration, the present invention achieves following advantages.

Compared with conventional arts, the PCIe/SAS connector of the present invention applies special terminal structures, which is fixed by integral plastic molding. The full-wrap iron cover casing greatly improves the interference of the signal terminal. The iron cover casings contact each other to form a complete cover. The iron cover casing replaces the grounding terminal at the contact region and the weld foot region, with one end corresponding to the engagement end, and the other end serving as weld foot to be welded on the pad, thereby compensating the deficiency of interference performance. Thus, the present invention fulfills the high-speed requirement of a new generation of PCIe/SAS connectors.

DETAILED DESCRIPTION OF THE INVENTION

Figure 1:
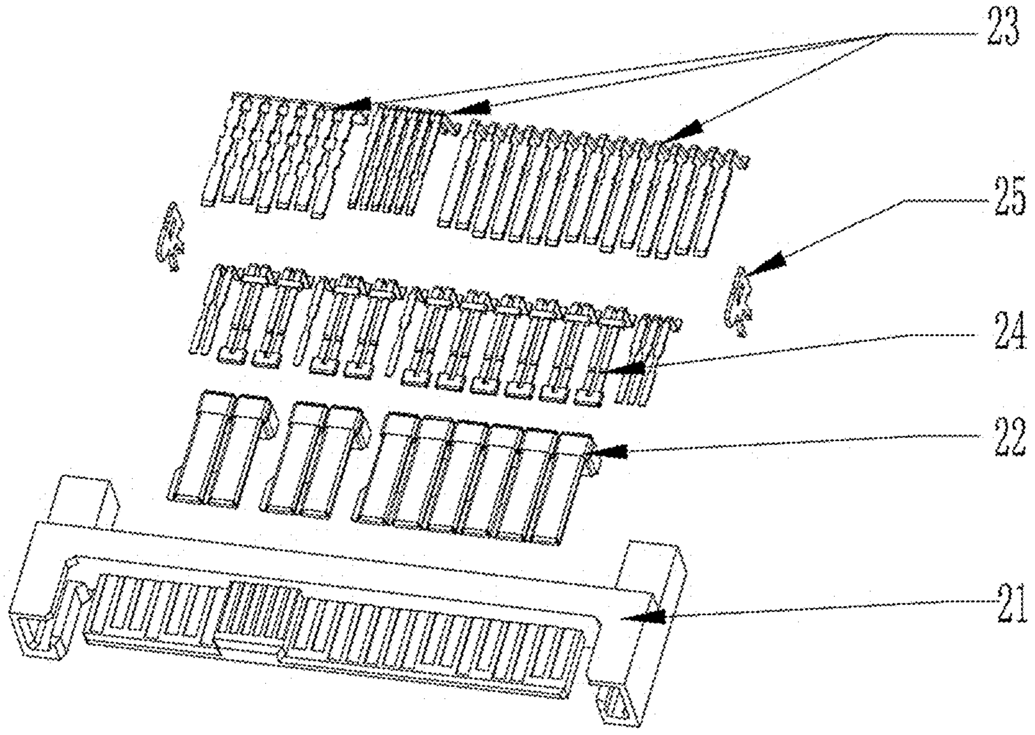
FIG. 1 is an exploded view of the male part of the PCIe/SAS connector in accordance with an embodiment of the present invention.
Figure 2:
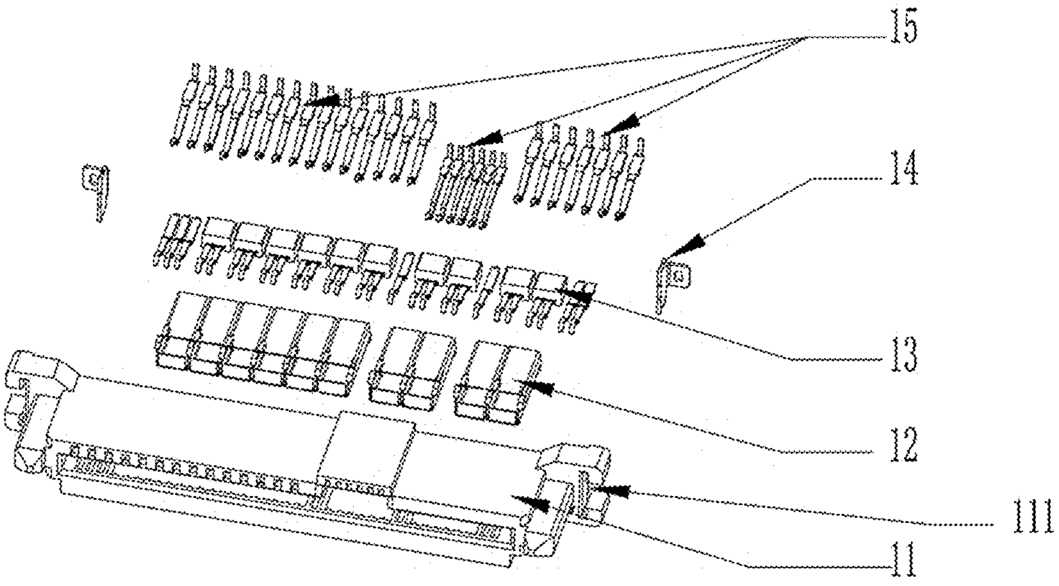
FIG. 2 is an exploded view of the female part of the PCIe/SAS connector in accordance with an embodiment of the present invention.
Figure 3:
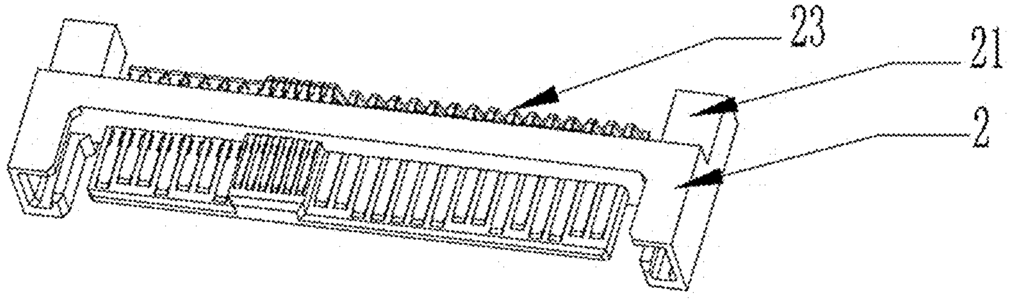
FIG. 3 is a front view of the male part of the PCIe/SAS connector in accordance with an embodiment of the present invention.
Figure 4:
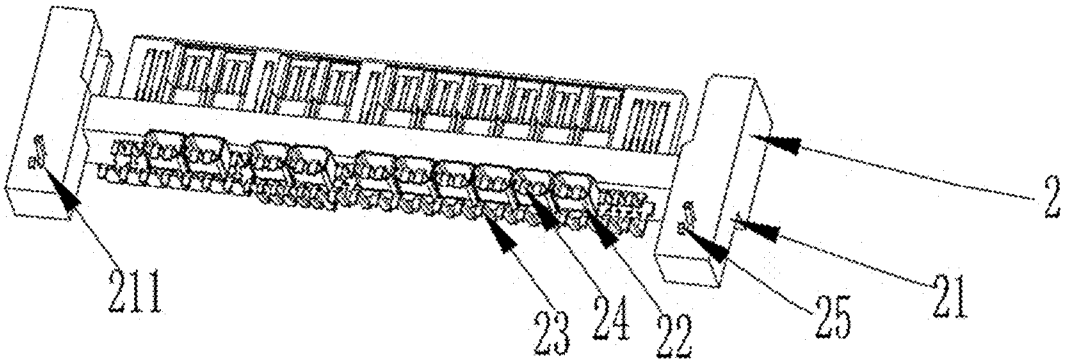
FIG. 4 is a rear view of the male part of the PCIe/SAS connector in accordance with an embodiment of the present invention.
Figure 5:
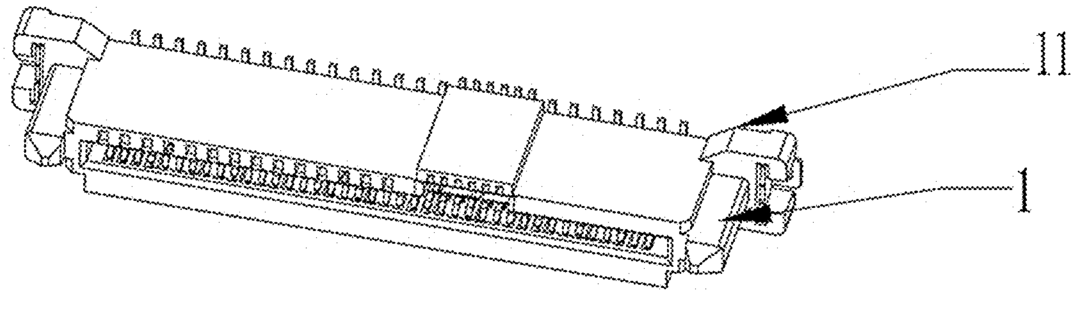
FIG. 5 is a front view of the female part of the PCIe/SAS connector in accordance with an embodiment of the present invention.
Figure 6:
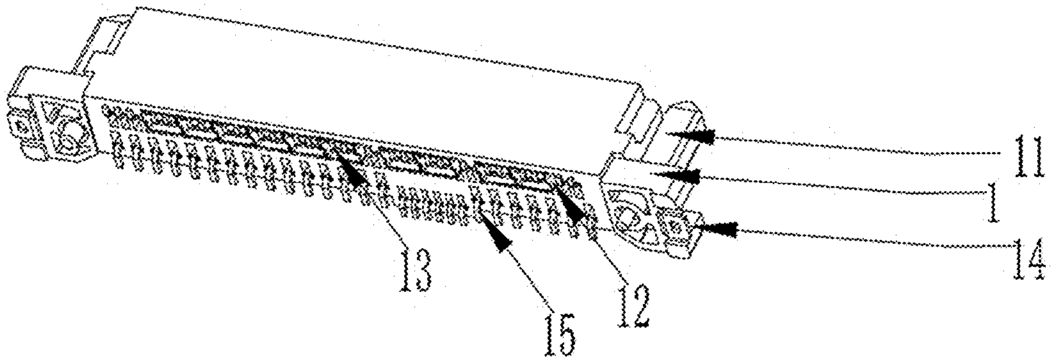
FIG. 6 is a rear view of the female part of the PCIe/SAS connector in accordance with an embodiment of the present invention.
Figure 7:
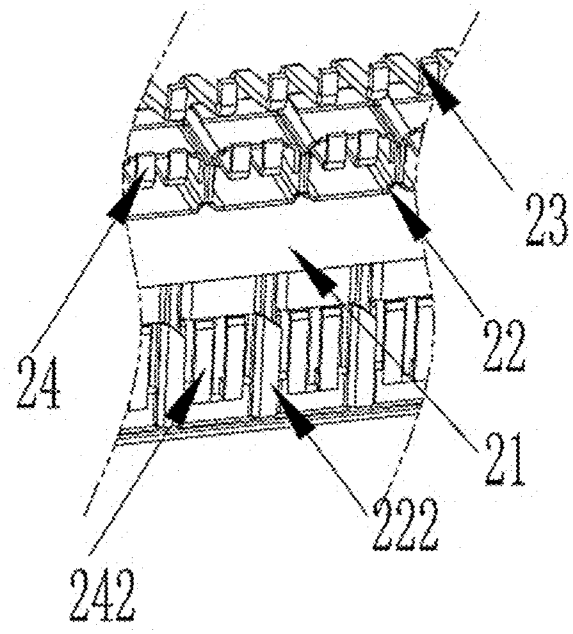
FIG. 7 is a structural schematic view of the male part of the PCIe/SAS connector in accordance with an embodiment of the present invention.
Figure 8:
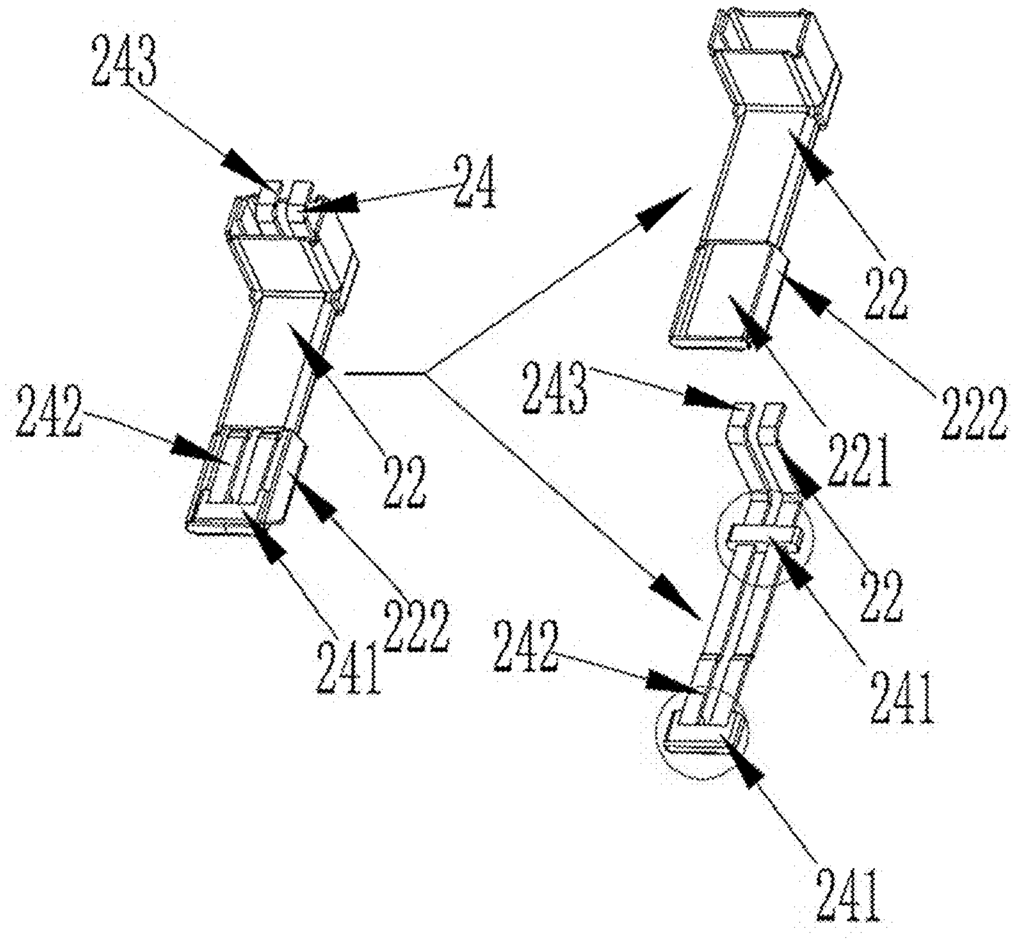
FIG. 8 is an exploded view of the male part of the PCIe/SAS connector in accordance with an embodiment of the present invention.
Figure 9:
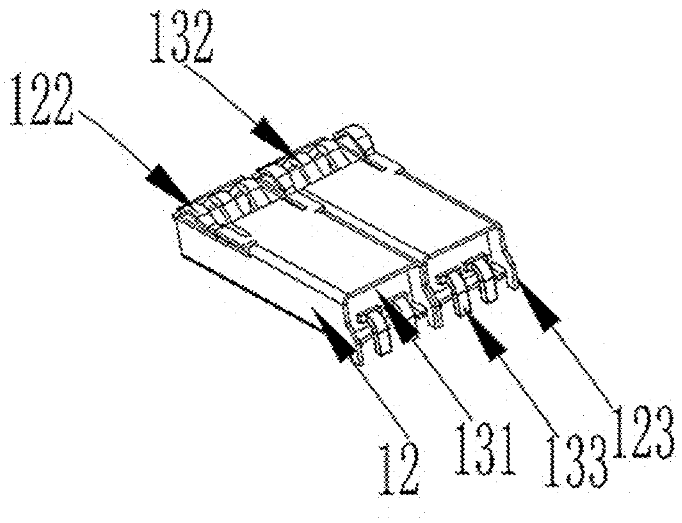
FIG. 9 is a structural schematic view of the female part of the PCIe/SAS connector in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 10, the present invention is described in detail with a specific embodiment. However, such embodiment does not limit the present invention.

Embodiment 1

Referring to FIG. 1 to FIG. 10, a Peripheral Component Interconnect Express (PCIe)/Serial Attached SCSI (SAS) (as known as PCIe/SAS) connector structure comprising a female part 1 and a male part 2; the female part 1 is engaged with the male part 2. In particular, the term "PCIe/SAS" describing the connector means that the connector is allowed to be connected with an equipment having a PCIe interface, and also allowed to be connected with an equipment having a SAS interface.

Therein, the female part 1 comprises a female plastic member 11, a female cover 12, a female signal terminal part 13, a fix pin 14 and a female signal and power terminal 15. As can be seen from FIG. 9, each female signal terminal 132 has a mating end (where reference number 132 points to), a mounting end 133 (wherein reference number 133 points to), and an intermediate portion between the mating end and the mounting end.

Therein the male part 2 comprises a male plastic member 21, a male cover 22, a male signal and power terminal 23, a male terminal 24, and a fix plate 25. As can be seen from FIG. 8, each male terminal 24 has a mating end (where reference number 242 points to), a mounting end (where reference number 243 points to), and an intermediate portion between the mating end and the mounting end.

Therein, the female signal terminal part 13 has a box body 131 disposed at the middle thereof; the box body 131 has one end provided with an arc terminal 132, and another end provided with a downward bent terminal 133 exposed from the box body 131; wherein the female cover 12 is in a full-wrap structure; each box body 131 corresponds to a female cover 12; the female cover 12 comprises an opening 121; wherein the arc terminal 132 of the female signal terminal part 13 is exposed from the opening 121; wherein the female cover 12 comprises a protruding elastic plate 122, respectively.

Therein, the male terminal 24 is formed in an L shape; two male terminals 24 are fixed as a set by a plastic 241; the male terminal 24 is inserted to be positioned in the male cover 22; wherein the male cover 22 is formed in an L shape in a full-wrap structure, wherein the male cover 22 comprises an opening 221 from which the male terminal 24 is exposed.

Therein, the male cover 22 has one end thereof sealed, with another end thereof provided with an opening.

Therein, the male terminal 24 has one end 242 thereof abutting against the sealed end of the male cover 22, with the terminal 243 of another end of the male terminal extending out from another opening on the other end of the male cover 22.

Figure 10:
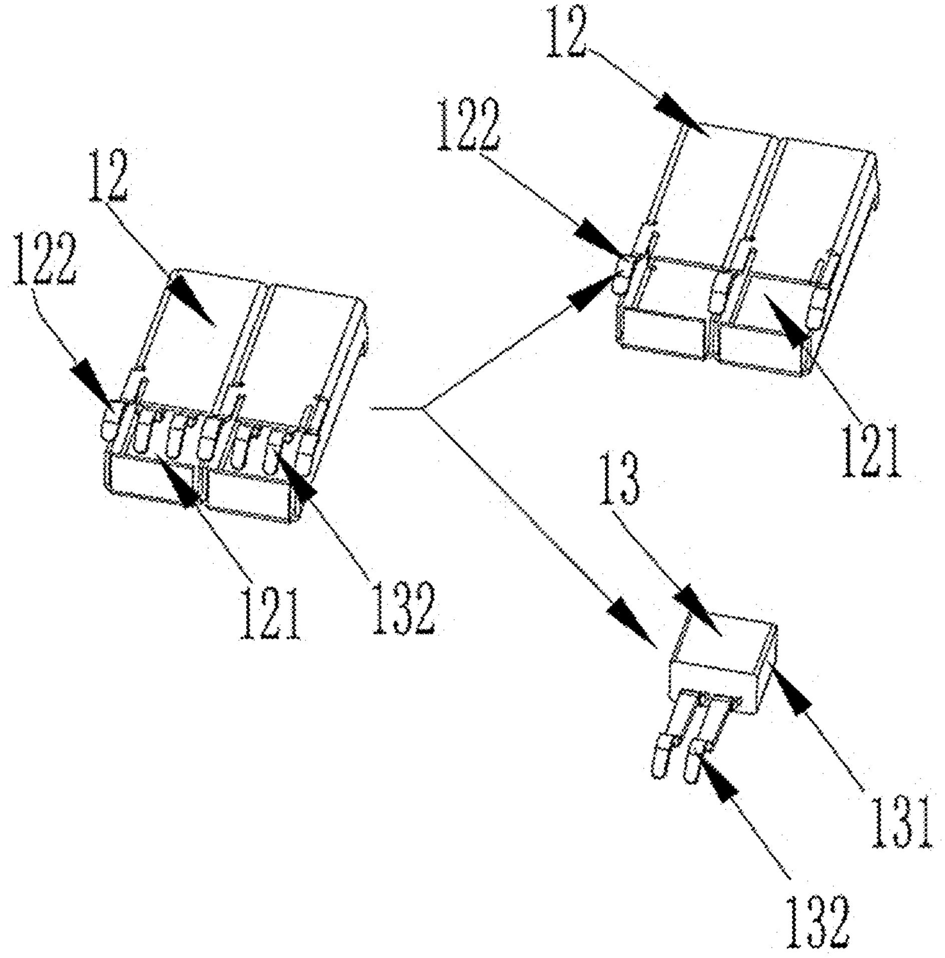
FIG. 10 is an exploded view of the female part of the PCIe/SAS connector in accordance with an embodiment of the present invention.

Referring to FIG. 1 and FIG. 10, a PCIe/SAS connector structure is provided, wherein the male signal and power terminal 23 is inserted in the male plastic member 21 and arranged in a single-row pins structure; the male terminal 24 is inserted in the male cover 22; wherein the male cover 22 is inserted in the male plastic member 21; the male plastic member 21 comprises an engagement notch 211 on two sides thereof, respectively; wherein the fix plate 25 is inserted in the engagement notch 211; wherein the female signal and power terminal 15 is engaged in the female plastic member 11 and arranged in a single-row pins structure; the female signal terminal part 13 is inserted in the female cover 12; wherein the female cover 12 is inserted in the female plastic member 11; the female plastic member 11 comprises an engagement groove 111 on two sides thereof, respectively; wherein the fix pin 14 is inserted in the engagement groove 111; wherein, a plurality of male covers 22 contact each other to form an overall cover; wherein the male cover 22 comprises a weld foot, and two male covers 22 are welded as a set on a pad; the male cover 22 is a male grounding terminal applied for connection with a ground of a Printed Circuit Board (PCB).

Therein, a plurality of female covers 12 contact each other to form an overall cover; wherein the female cover 12 comprises a weld foot 123, and two female covers 12 are welded as a set on a pad; the female cover 12 is a female grounding terminal applied for connection with a ground of a PCB.

Therein, the elastic plate 122 of the female cover 12, when in engagement, contacts the corresponding male ground terminal 24. Therein, two sides of the opening 221 of the male cover 22 comprises an outwardly opened elastic board 222, wherein, in engagement, the elastic boards 222 on two sides of the male cover 22 contact the female grounding terminal. Thus, the interference performance of the signal terminal is greatly improved, so as to fulfill the high-speed requirement of a new generation of PCIe/SAS connectors.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A Peripheral Component Interconnect Express (PCIe)/Serial Attached SCSI (SAS) connector assembly comprising:

a female connector comprising:

a female plastic member;

a plurality of female covers in the female plastic member; and a plurality of female signal terminals arranged in a row and inserted in the plurality of female covers;

a male connector comprising:

a male plastic member, a plurality of male covers in the male plastic member, and a plurality of male signal terminals arranged in a row and inserted in the plurality of male covers, wherein:

each of the plurality of female covers comprises an opening that exposes mating contact portions of the female signal terminals inserted therein, and a protruding elastic plate disposed beside the opening; and each of the plurality of male covers comprises an opening that exposes mating contact portions of the male signal terminals inserted therein, and a protruding board disposed beside the opening and configured to make contact with the protruding elastic plate of a corresponding first female cover.

2. The PCIe/SAS connector assembly of claim 1, wherein the plurality of male covers contact each other to form an overall cover.

3. The PCIe/SAS connector assembly of claim 1, wherein, the plurality of female covers each comprises a foot, and two first metal covers are configured to mount as a set.

4. An electrical connector comprising:

a plastic member;

a plurality of signal terminals coupled to the plastic housing and disposed in a plurality of groups of signal terminals, each of the signal terminals comprising a mating end, a mounting end and an intermediate portion joining the mating end and the mounting end; and a plurality of covers associated with respective groups of the plurality of groups of signal terminals, wherein:

each of the plurality of covers comprises a first opening and a second opening, the intermediate portions of the signal terminals of the respective group of signal terminals are disposed within the cover such that the mating ends are exposed through the first opening and the mounting ends are exposed through the second opening, and each of the plurality of covers comprises a mating end, the mating end comprising a plurality of side portions surrounding the mating end on three sides and an end portion orthogonal to the plurality of side portions, the first opening of the cover being through a side of the cover that is orthogonal to the end portion.

5. The electrical connector of claim 4, wherein:

the mating ends of the plurality of signal terminals are disposed in a row; and each of the plurality of covers comprises an elastic board or plate, the elastic board or plate disposed within the row of the mating ends of the plurality of signal terminals.

6. The electrical connector of claim 5, wherein:

the cover comprises a metal component, and the elastic board or plate is integral with the metal component.

7. The electrical connector of claim 6, wherein:

each of the plurality of covers comprises the elastic board; and the mating ends of the plurality of signal terminals are blades.

8. The electrical connector of claim 7, wherein:

the electrical connector is a plug.

9. The electrical connector of claim 8, wherein:

the plastic member comprises a wall with a first side and as second side; and blades are exposed through openings in the first side of the wall.

10. The electrical connector of claim 6, wherein:

each of the plurality of covers comprises the elastic plate; and the mating ends of the plurality of signal terminals are compliant beams.

11. The electrical connector of claim 10, wherein:

the electrical connector is a receptacle.

12. The electrical connector of claim 11, wherein:

the plastic member comprises a slot with a first side and a second side; and mating contact surfaces on the beams line the first side of the slot.

13. An electrical connector, comprising:

a plastic member;

a plurality of signal conductors coupled to the housing and disposed in a plurality of groups of signal terminals, each of the signal conductors comprising a mating end, a mounting end and an intermediate portion joining the mating end and the mounting end, wherein the mounting ends of the plurality of signal terminals are disposed in a row and configured to mount to a printed circuit board;

a plurality of covers associated with respective groups of the plurality of groups of signal terminals, wherein:

each of the plurality of covers comprises a first opening and a second opening, the intermediate portions of the signal terminals of the respective group of signal terminals are disposed within the cover such that the mating ends are exposed through the first opening and the mounting ends are exposed through the second opening, and the plurality of covers comprise a plurality of feet disposed in the row such that a foot of a cover is disposed adjacent to and on each side of the mounting ends of the signal terminals of each of the plurality of groups and a foot of the plurality of feet is narrower than a mounting end of the mounting ends of the plurality of signal terminals.

14. The electrical connector of claim 13, wherein:

the plurality of feet of the plurality of covers comprise mounting tabs.

15. The electrical connector of claim 13, wherein:

the mounting ends of the plurality of signal terminals and the feet of the plurality of covers are disposed in a linear array, the linear array comprising a repeating pattern of one foot of a cover followed by two mounting ends of signal terminals; and one foot of a cover following the repeating pattern.

16. The electrical connector of claim 15, wherein:

the linear array of the mounting ends of the plurality of signal terminals and the feet of the plurality of covers are configured in compliance with specification for Peripheral Component Interconnect Express (PCIe)/Serial Attached SCSI (SAS) connectors.

17. The electrical connector of claim 13, wherein:

the mating ends of the plurality of covers and the mating ends of the plurality of signal terminals are blades.

18. The electrical connector of claim 17, wherein:

the electrical connector is a plug.

19. The electrical connector of claim 13, wherein:

the mating ends of the plurality of covers and the mating ends of the plurality of signal terminals are compliant beams.

20. The electrical connector of claim 19, wherein: the electrical connector is a receptacle.

* * * * *